United States Patent [19]

Rosinski et al.

[11] 4,391,785

[45] Jul. 5, 1983

[54] PREPARATION OF ZSM-12 TYPE ZEOLITES

[75] Inventors: Edward J. Rosinski, Pedricktown, N.J.; Mae K. Rubin, Bala Cynwyd, Pa.

[73] Assignee: Mobil Oil Corporation, New York, N.Y.

[21] Appl. No.: 332,793

[22] Filed: Dec. 21, 1981

[51] Int. Cl.³ .............................................. C01B 33/28
[52] U.S. Cl. .................................. 423/329; 252/455 Z; 423/328; 423/332
[58] Field of Search .......................... 423/326–333, 423/335; 252/431 N, 438, 449, 455 Z; 546/2, 11, 14; 260/326.61, 326.8

[56] References Cited

U.S. PATENT DOCUMENTS 3,832,449 8/1974 Rosinski et al. ..................... 423/328
4,000,248 12/1976 Martin .............................. 423/328 X
4,046,859 9/1977 Plank et al. ......................... 423/328
4,061,717 12/1977 Kerr et al. ........................... 423/329
4,251,499 2/1981 Nanne et al. ....................... 423/329
4,259,306 3/1981 Pelrine .............................. 423/329

FOREIGN PATENT DOCUMENTS 21445 7/1981 European Pat. Off. ............ 423/328

Primary Examiner—Edward J. Meros
Attorney, Agent, or Firm—Charles A. Huggett; Michael G. Gilman; Charles J. Speciale

[57] ABSTRACT

A new and useful improvement in the method for preparing synthetic crystalline aluminosilicate zeolite ZSM-12 is provided. The improved method comprises synthesizing ZSM-12 in the presence of cyclic quaternary amine halides as templates rather than the conventional template of tetraethylammonium.

6 Claims, No Drawings

PREPARATION OF ZSM-12 TYPE ZEOLITES

BACKGROUND OF THE INVENTION

This invention relates to a new and improved method of preparing zeolite ZSM-12 and, more particularly, is directed towards the synthesis of ZSM-12 from gel mixtures containing certain cyclic quaternary amine halides as opposed to the tetraethylammonium ions conventionally employed.

Discussion of Prior Art

Zeolite ZSM-12 and its conventional preparation are taught in U.S. Pat. No. 3,832,449, the entire disclosure of which is hereby incorporated by reference. ZSM-12 has a distinctive X-ray pattern which identifies it from other known zeolites and it has not been previously prepared from an organic template which is a cyclic quaternary amine halide.

It has been known in the art as is disclosed in U.S. Pat. No. 4,205,053 to add certain organic basic nitrogen compounds in addition to the organic nitrogenous template in the synthesis of various zeolites. In said patent, ethyl pyridinium bromide is disclosed as being a useful additive in addition to the organic template conventionally employed for the synthesis of various zeolites. In the novel process of this invention, certain cyclic quaternary amine halides are utilized as the sole template in the synthesis of zeolite ZSM-12.

European patent application No. 21,445, published Jan. 7, 1981 discloses the use of a reaction mixture containing diethylpiperidinium expressed as an oxide for zeolite synthesis.

In addition, certain U.S. Pat. Nos. such as 4,259,306, 4,146,584 and 4,107,195 disclose the use of cyclic amines as opposed to the instant cyclic quaternary amine halides for the synthesis of zeolites other than ZSM-12. It will be shown in the examples that such cyclic amines do not produce ZSM-12.

SUMMARY OF THE INVENTION

The novel process of this invention is carried out by replacing the tetraethylammonium cations conventionally used in the synthesis of zeolite ZSM-12 with dimethyl pyridinium, dimethyl piperidinium, and dimethyl pyrrolidinium halides. Although various halides can be used, such as the chloride, the bromide, the iodide, the particularly preferred halide is the bromide. It is also within the scope of this invention to prepare the cyclic quaternary ammonium halide in situ such as by the reaction of N-methylpyrrolidine and bromomethane.

ZSM-12 can suitably be prepared in accordance with the novel process of this invention by preparing a solution containing at least one of the cyclic quaternary amine halides previously referred to, sodium oxide, an oxide of silica, and optionally, an oxide of alumina and water and having a composition in terms of mole ratios of oxides falling within the following ranges:

|  | Broad | Preferred |
| --- | --- | --- |
| $OH^-/SiO_2$ | 0.1–0.40 | 0.15–0.25 |
| $R/R+M+$ | 0.2–0.95 | 0.28–0.90 |
| $SiO_2/Al_2O_3$ | 40–$\infty$ | 85–500 |
| $H_2O/OH^-$ | 20–300 | 5–100 | wherein R is dimethyl pyrrolidinium, dimethyl piperidinium, or dimethyl pyridinium halide, M is an alkali metal and maintaining the mixture until crystals of the zeolite are formed. Thereafter, the crystals are separated from the liquid and recovered. Typical reaction conditions consist of heating the reaction mixture to a temperature of from about 80° C. to 180° C. for a period of time ranging from about 6 hours to 150 days. A more preferred temperature range is from about 100° to about 150° for a period of time ranging from about 12 to 40 days.

Description of Specific Embodiments

ZSM-12 zeolites can have the original cations associated therewith replaced by a wide variety of other cations according to techniques well known in the art. Typical cations would include hydrogen, ammonium and metal cations including mixtures of the same. Of the replacing metallic cations, particular preference is given to cations of metals such as rare earth metals, manganese, calcium, as well as metals of Group II of the Periodic Table, e.g. zinc, and Group VIII of the Periodic Table, e.g. nickel.

Typical ion exchange techniques would be to contact the ZSM-12 zeolites with a salt of the desired replacing cation or cations. Although a wide variety of salts can be employed, particular preference is given to chlorides, nitrates and sulfates.

Representative ion exchange techniques are disclosed in a wide variety of patents including U.S. Pat. Nos. 3,140,249; 3,140,251 and 3,140,253.

Following contact with the salt solution of the desired replacing cation, the zeolites are then preferably washed with water and dried at a temperature ranging from 150° F. to 1500° F. for periods of time ranging from 1 to 48 hours or more.

Regardless of the cations replacing the sodium in the synthesized form of the ZSM-12 the spatial arrangement of the aluminum, silicon and oxygen atoms which form the basic crystal lattices of ZSM-12, remains essentially unchanged by the described replacement of sodium or other alkali metal as determined by taking an X-ray powder diffraction pattern of the ion-exchanged material.

The aluminosilicates prepared by the instant invention are formed in a wide variety of particular sizes. Generally speaking, the particles can be in the form of a powder, a granule, or a molded product, such as extrudate having particle size sufficient to pass through a 2 mesh (Tyler) screen and be retained on a 400 mesh (Tyler) screen. In cases where the catalyst is molded, such as by extrusion, the aluminosilicate can be extruded before drying or dried or partially dried and then extruded.

In the case of many catalysts, it is desired to incorporate the ZSM-12 with another material resistant to the temperatures and other conditions employed in organic conversion processes. Such materials include active and inactive materials and synthetic or naturally occurring zeolites as well as inorganic materials such as clays, silica and/or metal oxides. The latter may be either naturally occurring or in the form of gelatinous precipitates or gels including mixtures of silica and metal oxides. Use of a material in conjunction with the ZSM-12, i.e. combined therewith which is active, tends to improve the conversion and/or selectivity of the catalyst in certain organic conversion processes. Inactive materials suitably serve as diluents to control the amount of conversion in a given process so that products can be obtained economically and orderly without employing other means for controlling the rate of reaction. Normally, zeolite materials have been incorporated into naturally occurring clays, e.g. bentonite and kaolin, to improve the crush strength of the catalyst under commercial operating conditions. These materials, i.e. clays, oxides, etc., function as binders for the catalyst. It is desirable to provide a catalyst having good crush strength, because in a petroleum refinery the catalyst is often subjected to rough handling, which tends to break the catalyst down into powder-like materials which cause problems in processing. These clay binders have been employed for the purpose of improving the crush strength of the catalyst.

Naturally occurring clays which can be composited with the ZSM-12 catalyst include the montmorillonite and kaolin family, which families include the subbentonites, and the kaolins commonly known as Dixie McNamee-Georgia and Florida clays or others in which the main mineral constituent is halloysite, kaolinite, dickite, nacrite, or anauxite. Such clays can be used in the raw state as originally mined or initially subjected to calcination, acid treatment or chemical modification.

In addition to the foregoing materials, the ZSM-12 catalyst can be composited with a porous matrix material such as silica-alumina, silica-magnesia, silica-zirconia, silica-thoria, silica-beryllia, silica-titania as well as ternary compositions such as silica-alumina-thoria, silica-alumina-zirconia, silica-alumina-magnesia and silica-magnesia-zirconia. The matrix can be in the form of a cogel. The relative proportions of finely divided crystalline aluminosilicate ZSM-12 and organic oxide gel matrix vary widely with the crystalline aluminosilicate content ranging from about 1 to 90 percent by weight and more usually, particularly when the composite is prepared in the form of beads in the range of about 2 to about 50 percent by weight of the composite.

Employing the ZSM-12 catalyst of this invention, containing a hydrogenation component, heavy petroleum residual stocks, cycle stocks, and other hydrocrackable charge stocks can be hydrocracked at temperatures between 400° F. and 825° F. using molar ratios of hydrogen to hydrocarbon charge in the range between 2 and 80. The pressure employed will vary between 10 and 2,500 psig and the liquid hourly space velocity between 0.1 and 10.

Employing the catalyst of this invention for catalytic cracking, hydrocarbon cracking stocks can be cracked at a liquid hourly space velocity between about 0.5 and 50, a temperature between about 550° F. and 1,100° F., a pressure between about subatmospheric and several hundred atmospheres.

Employing a catalytically active form of the ZSM-12 zeolite of this invention containing a hydrogenation component, reforming stocks can be reformed employing a temperature between 700° F. and 1,000° F. The pressure can be between 100 and 1,000 psig but is preferably between 200 and 700 psig. The liquid hourly space velocity is generally between 0.1 and 10, preferably between 0.5 and 4 and the hydrogen to hydrocarbon mole ratio is generally between 1 and 20, preferably between 4 and 12.

The catalyst can also be used for hydroisomerization of normal paraffins, when provided with a hydrogenation component, e.g. platinum. Hydroisomerization is carried out at a temperature between 200° and 700° F., preferably 300° to 550° F., with a liquid hourly space velocity between 0.01 and 2, preferably between 0.25 and 0.50 employing hydrogen such that the hydrogen to hydrocarbon mole ratio is between 1:1 and 5:1. Additionally, the catalyst can be used for olefin or aromatic isomerization employing temperatures between 30° F. and 500° F.

The catalyst can also be used for reducing the pour point of gas oils. This reduction is carried out at a liquid hourly space velocity between about 10 and about 30 and a temperature between about 800° F. and about 1,100° F.

Other reactions which can be accomplished employing the catalyst of this invention containing a metal, e.g. platinum, include hydrogenation-dehydrogenation reactions and desulfurization reactions.

It is to be noted that there are some differences between the ZSM-12 prepared in accordance with the novel process of this invention and ZSM-12 as prepared in U.S. Pat. No. 3,832,449. The differences are rather subtle, but X-ray analysis indicates that the ZSM-12 prepared in accordance with this invention exhibits a diffraction pattern which shifts towards higher angular positions indicating a contracted lattice. The lattice contraction causes a lowering of the unit cell volume by about 4% and also a narrowing of the pore openings making them more restrictive and changing their shape selectivity. Quite obviously, such a shift affects the absorption properties of the material. It is pointed out, however, that the material is definitely ZSM-12 and it still has the interplanar spacing set forth in Table 1 of U.S. Pat. No. 3,832,449; as well as the lattice parameters set forth at column 3 of said patent.

The following examples will illustrate the novel process of this invention.

EXAMPLES 1-4

In each of Examples 1-4, ZSM-12 was prepared from a gel reaction mixture containing colloidal silica sol (30% $SiO_2$), an aqueous solution of sodium hydroxide (50%), sodium aluminate ($NaAlO_2$-43.3% $Al_2O_3$, 32.9% $Na_2O$, 25.6% $H_2O$), dimethylpiperidinium bromide and water.

The reactants were mixed together and then crystallized at static conditions at various temperatures for periods of time ranging from 21 to 141 days. After crystallization, the solid product was cooled to room temperature, filtered, washed with water and dried at 230° F.

The product of each of Examples 1-4 was subjected to X-ray and each example produced ZSM-12. ZSM-12 has the following significant lines (U.S. Pat. No. 3,832,449).

| Interplanar Spacing d(A) | Relative Intensity |
|---|---|
| 11.9 ± 0.2 | M |
| 10.1 ± 0.2 | M |
| 4.76 ± 0.1 | W |
| 4.29 ± 0.08 | VS |
| 3.98 ± 0.08 | M |
| 3.87 ± 0.07 | VS |
| 3.49 ± 0.07 | W |
| 3.38 ± 0.07 | M |
| 3.20 ± 0.06 | W |
| 3.05 ± 0.05 | W |
| 2.54 ± 0.03 | W |

Additional information as well as specific reaction conditions are shown in the following table wherein weights of reactants are in grams and R represents dimethylpiperidinium bromide:

TABLE

| | Example | | | |
|---|---|---|---|---|
| | 1 | 2 | 3 | 4 |
| NaAlO$_2$ | 0.91 | →  | 1.8 | 0.91 |
| NaOH solution | 6.0 | → | 12.0 | 6.0 |
| H$_2$O | 55.0 | → | 110.0 | 75.0 |
| Colloidal Silica | 76.0 | → | 152.0 | 76.0 |
| Dimethylpiperidinium Bromide | 15.0 | → | 25.0 | 15.0 |
| Mixture Composition, mol ratios | | | | |
| SiO$_2$/Al$_2$O$_3$ | 98.4 | → | | |
| R/R+M+ | 0.48 | → | 0.43 | 0.48 |
| OH$^-$/SiO$_2$ | 0.22 | → | | |
| H$_2$O/OH$^-$ | 73.1 | → | | |
| Crystallization | Static | → | | |
| Temp., °C. | 150 | 138 | 99 | 140 |
| Time, days | 21 | 41 | 171 | 41 |
| Product Composition, wt. % | | | | |
| C | 5.80 | 6.5 | | |
| N | 0.86 | 1.27 | 1.21 | 0.96 |
| Na | 0.26 | 0.24 | 0.58 | 0.37 |
| Al$_2$O$_3$ | 1.90 | 1.70 | 2.11 | 1.80 |
| SiO$_2$ | 84.5 | 83.5 | 89.2 | 92.4 |
| Ash | 90.9 | 90.0 | 86.0 | 91.0 |
| Adsorption, wt. % (after calcining 16 hrs 538° C.) | | | | |
| Cy—C$_6$ | 4.3 | 5.6 | 7.4 | 4.7 |
| N—C$_6$ | 4.3 | 4.9 | 6.5 | 4.7 |
| H$_2$O | 8.4 | 8.9 | 9.9 | 9.0 |
| Surface Area m$^2$/gm | 171 | 236 | 283 | 180 |

EXAMPLES 5-6

In each of Examples 5 and 6, ZSM-12 was prepared from a gel reaction mixture as in Examples 1-4 with the exception that dimethylpyrrolidinium bromide was used instead of dimethylpiperidinium bromine.

EXAMPLE 7

The procedure of Examples 5 and 6 was repeated with the exception that Al$_2$(SO$_4$)$_3$.18H$_2$O, sulfuric acid and sodium silicate (28.8% SiO$_2$, 8.9% Na$_2$O, 62% H$_2$O) was used in place of the sodium aluminate. ZSM-12 was obtained.

Additional data for Examples 5-7 are shown in the following table where reactants are expressed in grams and R represents dimethylpyrrolidinium bromide.

TABLE

| | Example | | |
|---|---|---|---|
| | 5 | 6 | 7 |
| NaAlO$_2$ | 0.91 | → | |
| Al$_2$(SO$_4$)$_2$.18 H$_2$O | | | 2.9 |
| 50% NaOH solution | 6.0 | → | 2.0 |
| H$_2$O | 55.0 | → | 103.0 |
| H$_2$SO$_4$ | | | 1.35 |
| Colloidal SiO$_2$ | 76.0 | → | |
| Na silicate | | | 30.5 |
| Dimethylpyrrolidinium bromide | 15.0 | → | 12.5 |
| Mixture Composition, mol ratios | | | |
| SiO$_2$/Al$_2$O$_3$ | 98.4 | → | 33.6 |
| R/R+M+ | 0.52 | → | 0.58 |
| OH$^-$/SiO$_2$ | 0.22 | → | 0.41 |
| H$_2$O/OH$^-$ | 73.1 | → | 114.6 |
| Crystallization | Static | → | |
| Temp., °C. | 143 | 154 | 138 |
| Time, Days | 13 | 21 | 35 |
| X-Ray Analysis | Amorphous+ ZSM-12 | ZSM-12 Changes High Cryst. | ZSM-12 +Amorphous |
| Product Composition, wt. % | | | |
| N | | 0.97 | |
| Na | | 0.24 | |
| Al$_2$O$_3$ | | 1.94 | |
| SiO$_2$ | | 91.1 | |
| Ash | | 91.5 | |
| Adsorption, wt. % (after calcining 16 hrs 538° C.) | | | |
| Cy—C$_6$ | | 1.9 | |
| N—C$_6$ | | 5.0 | |
| H$_2$O | | 7.3 | |
| Surface Area m$^2$/gm | | 214 | |

EXAMPLE 8

This example demonstrates the preparation of ZSM-12 with no added alumina.

12.0 gms of dimethylpiperidinium bromide were added to a solution containing 2.2 gms of CrK(SO$_4$)$_2$.12H$_2$O, 1.3 gms H$_2$SO$_4$, 53 gms H$_2$O. This was added to a mixture of 30.5 gms of sodium silicate (28.8% SiO$_2$, 8.9% Na$_2$O, 62.3% H$_2$O) and mixed.

The mixture was crystallized at 138° F. for 38 days. The resultant product contained approximately 70% ZSM-12 and some unidentified crystalline material.

This product when calcined at 538° C. and exchanged with 10% NH$_4$Cl solution had the following composition, wt. %:

| Cr | 1.9 |
|---|---|
| Al$_2$O$_3$ | 0.23 |
| SiO$_2$ | 91.9 |
| SiO$_2$/Al$_2$O$_3$ (mole ratios = 679) | |

EXAMPLE 9

This example illustrates the synthesis of ZSM-12 using dimethylpyrrolidinium bromide which is prepared in situ.

| Gel Preparation, gms. | |
| --- | --- |
| A. NaAlO$_2$ | 0.91 |
|     50% NaOH solution | 6.0 |
|     H$_2$O | 55.0 |
| B. Colloidal SiO$_2$ | 76.0 |
| C. N—methylpyrrolidine (97%) | 7.1 |
| D. Bromomethane | 13.4 |

Added B to A and mixed. Added C, then D which had been cooled in ice. The mixture was transferred to a glass-lined reactor and crystallized at 150° C. for 24 days.

| Mixture Composition, mole ratios | |
| --- | --- |
| SiO$_2$/Al$_2$O$_3$ | = 98.4 |
| $\dfrac{R_1N + R_2X}{R_1N + R_2X + M}$ | = 0.79 |
| OH$^-$/SiO$_2$ | = 0.22 |
| H$_2$O/OH$^-$ | = 73.1 | wherein $R_1N$ = [N-methylpyrrolidine ring with N-CH$_3$] and $R_2$ = CH$_3$

X-ray Analysis: ZSM-12, highly crystalline

| Product Composition, wt. % | |
| --- | --- |
| N = | 1.05 |
| Na = | 0.22 |
| Al$_2$O$_3$ = | 1.72 |
| SiO$_2$ = | 78.7 |
| Ash = | 92.2 |
| Adsorption, wt. % (after calcining 16 hrs. 538° C.) | |
| Cy—C$_6$ = | 4.9 |
| N—C$_6$ = | 5.2 |
| H$_2$O = | 6.5 |
| Surface Area, m$^2$/gm | 220 |

EXAMPLES 10–12

The products of Examples 3, 4 and 6 were subjected to catalytic testing. In each case the ZSM-12 was calcined in air at 1000° F. for ten hours and then base exchanged with a 10% by weight aqueous solution of ammonium chloride at 85° C. five times—each time lasting about one hour and then recalcined at 1000° F. Each of the products of Examples 3, 4 and 6 was evaluated for alpha activity.

As is well known in the art, the alpha activity gives an approximate indication of the catalytic cracking activity of the catalyst compared to a standard catalyst and it gives the relative rate constant (rate of normal hexane conversion per volume of oxide composition per unit time). It is based on the activity of the highly active silica alumina cracking catalyst taken as an alpha of 1. This test is described in U.S. Pat. No. 3,354,078 and in *The Journal of Catalysis*, Vol. 4, pp. 522–529, August 1965.

In addition, the catalyst of Example 3 was also evaluated for methanol conversion and for the olefination of propylene.

The results obtained are shown in the following table.

| | Example | | |
| --- | --- | --- | --- |
| | 10 | 11 | 12 |
| Catalyst Description | Ex. 3 | Ex. 4 | Ex. 9 |
| Na, wt. % | <0.01 | 0.01 | 0.07 |
| Alpha-values | | | |
|   5 minutes | 13.2 | 42.0 | 324 |
|   25 minutes | 7.5 | 17.0 | 99 |
| Olefination, Temp. °F. | 700 | | |
| WHSV | 6.6 | | |
| % Conversion | 21.3 | | |
| Methanol Conversion | | | |
| Temp., °F. | 700 | | |
| WHSV | 3.0 | | |
| % Conversion | 37.5 | | |
| % C$_2$= | 6.1 | | |
| % C$_5$+ | 53.9 | | |
| % Coke | 4.7 | | |
| Steam Treated | | | |
| 20 hrs at 482° C. | | | |
| α value 5 minutes | | | 51 |
| α value 25 minutes | | | 47 |

As is obvious from the above, the ZSM-12 prepared in accordance with this invention was catalytically active.

EXAMPLE 13

Preparation of dimethylpiperidinium bromide used in Examples 1–4.

100 g. of N-methylpyrrolidine was dissolved in 200 cc acetone and the methylbromide added dropwise while stirring. Solids formed and allowed to stand for two hours. The solids were filtered and washed with ethylacetate and filtered. Dried under vacuum overnight. Recrystallized in ethanol and melting point determined. 359° C. (Lit=342° C.).

Wegand, F. and Daniel, H., Chem. Ber. 94, 1688 (1961). CA 55, 22284 F (1961).

| | | | Calculated |
| --- | --- | --- | --- |
| Chemical Analysis, Wt. % | C | 39.6 | 40.01 |
| | H | 7.8 | 7.83 |
| | N | 7.8 | 7.78 |
| | Br | 38.8 | 44.8 |

EXAMPLE 14

Preparation of dimethylpyrrolidinium bromide used in Examples 5–7.

Methyl bromide was slowly added to the acetone N-methyl piperidine solution. The solids which formed were allowed to stand one hour. Solids were filtered and reslurried with ether. Solids were filtered and dried under vacuum in dessicator overnight.

Recrystallized from ethanol and melting point determined=357° C. (Lit=346° C.).

Lukes, R. and Vasely, Z., Chem. Listy 50, 1643 (1956). CA 51, 1949 F (1957).

| | | | Calculated |
| --- | --- | --- | --- |
| Chemical Analysis, Wt. % | C | 53.3 | 43.31 |
| | H | 8.4 | 8.31 |
| | N | 7.2 | 7.22 |
| | Br | 36.0 | 41.16 |

As indicated earlier, X-ray analysis of the ZSM-12 produced by the instant invention shows subtle differences from that produced using tetraethylammonium bromide in accordance with U.S. Pat. No. 3,832,449.

Thus, when the X-ray diffraction pattern of Example 6 is compared to a conventional ZSM-12, a shift to higher angular positions is noted. All three unit cell parameters and the beta angle of Example 6 are smaller than their corresponding parameters in the ZSM-12 standard.

| Sample | a (A) | b (A) | c (A) | beta (A) |
|---|---|---|---|---|
| Standard | 12.67 | 11.17 | 24.44 | 108.11 |
| Example | 12.46 | 10.99 | 24.33 | 108.07 |

EXAMPLE 15

This example will illustrate that a quaternary cyclic amine halide is essential and that a cyclic amine of the prior art is inoperative.

The procedure of Example 6 was repeated with the exception that pyrrolidine was used in place of dimethylpyrrolidinium bromide.

The product obtained was ZSM-14 as opposed to ZSM-12.

What is claimed is:

1. In a process for manufacturing synthetic zeolite ZSM-12 which process comprises crystallizing an aqueous forming solution comprising a source of silica and an nitrogenous template and recovering said zeolite ZSM-12, the improvement which comprises utilizing as said nitrogenous template a compound selected from the group consisting of dimethyl pyridinium and dimethyl pyrrolidinium halides.

2. The process of claim 1 wherein said organic template is dimethyl pyridinium halide.

3. The process of claim 1 wherein said organic nitrogenous template is dimethyl pyrrolidinium halide.

4. A process for preparing zeolite ZSM-12 which comprises preparing a mixture containing sources of an alkali metal oxide and organic nitrogen containing oxide, an oxide of silicon with and without an oxide of aluminum and water and having a composition in terms of mole ratios of oxides falling within the following ranges:

| | |
|---|---|
| $OH^-/SiO_2$ | 0.1–0.40 |
| $R/R+M+$ | 0.2–0.95 |
| $SiO_2/Al_2O_3$ | 40–∞ |
| $H_2O/OH^-$ | 20–300 | wherein R is dimethyl pyrrolidinium or dimethyl pyridinium halide and M is an alkali metal ion and maintaining the mixture at elevated temperatures until crystals of ZSM-12 are formed.

5. The process of claim 4 wherein R is dimethyl pyrrolidinium halide.

6. The process of claim 4 wherein R is dimethyl pyridinium halide.

* * * * *